UNITED STATES PATENT OFFICE.

HERBERT CASTOR, OF McKEESPORT, PENNSYLVANIA.

HEAT-INSULATING MATERIAL AND PROCESS FOR MAKING THE SAME.

1,288,834. Specification of Letters Patent. Patented Dec. 24, 1918.

No Drawing. Application filed July 30, 1918. Serial No. 247,412.

*To all whom it may concern:*

Be it known that I, HERBERT CASTOR, a citizen of the United States of America, residing at McKeesport, in the county of Allegheny and State of Pennsylvania, have invented certain new and useful Improvements in Heat-Insulating Material and Processes for Making the Same, of which the following is a specification.

The primary object of the invention is the production of refractory or fire proof material, being a heat insulator, and adapted for many uses, such as the formation of building material, roofing, tile sheathing and the like.

This material forms a new article of manufacture that is highly refractory fire and sound proof, has great strength of compression, high heat insulating qualities and low specific gravity as well as being absorbent. This improved article may be easily sawed, cut, drilled, and nailed, while the same requires no special packing for transportation and is handled after the manner of and with no more care than that required for fire clay brick.

The gist of my invention resides in the formation of a new article by a process which converts a raw material into the finished product. The accomplishment of this object is brought about by taking infusorial earth cut from the natural deposit in blocks or desirable shapes and placed in a kiln of suitable design for subjection to a suitable temperature by the application of either direct or indirect heat or both, and for a period of time necessary for the required amount of baking. The temperature to which the earth is subjected is varied to suit the requirements of the finished product and may be from about 1800° Fahrenheit and upward to say 3000° F. The infusorial earth forming the raw material is well known, being mined in large blocks for sawing into desirable shapes and may be powdered and compressed if desired. In the production of slabs for lining the interior building walls, the slabs are cut from the infusorial earth and baked for a comparatively short period of time at a low temperature of say 1800° F., being thereafter cut, drilled, sawed, planed or smoothed by grinding or similar means for imparting a finished surface thereto. Upon removing the dust from the slabs an application of paint or varnish may be applied thereto for imparting a desirable finished appearance to the exposed surface of the slab. Porch columns, door and window moldings as well as roofing tile are inexpensively produced by similar treatment.

In making bricks or building blocks for the construction of furnace walls, roofs or flues, where extremely high heat intensities are to be withstood, the infusorial earth requires baking for a longer period of time at a higher temperature and in some cases exceeding 3000° F. depending on the intensities of heat to which the material will be subjected when in use.

I also attain by this process the production of building material for furnaces which combines properties highly essential to furnace construction, efficient operation and maintenance. Such material must be refractory, capable of standing extremely high temperatures must possess great strength of compression when at high temperatures, the material hardening as the temperature is increased, of low specific gravity and high heat insulating qualities. At a temperature of 2500° F. my improved material possesses from eight to ten times the heat resisting qualities of ordinary fire brick. The heating of the block or powdered infusorial earth upwards of 1800° F. in carrying out my process may be performed by direct or indirect heat in an air tight chamber or otherwise, the required temperature being maintained for a necessary period of time which in some instances may be fourteen days.

Conservation of fuel and furnace efficiency has led to efforts to reduce the losses in heating units, radiating from the walls and roofs of furnaces, but such efforts have met with only a limited degree of success. This success has been mainly limited to furnaces operating at temperatures below 1900° F. The usual method employed is to cover the outside of the furnace walls and roof with material of low heat conductivity made in brick formation or in a pulverized condition. When this method is employed, the bricks forming the walls and roof tend to reach a temperature equlibrium throughout the wall of their mass, equal to the atmosphere of the furnace interior. When the temperature exceeds 2200° or 2300° F., the walls and roof constructed of fire clay brick begin to soften, losing their strength of compression and ultimately collapse. The bricks or blocks produced by my process entirely eliminate such a condition due to the fact that they will not soften at any ordinary furnace temperature and that heat will not reduce their strength of compression. Moreover, my form of material serves the combined purpose of the building material for the walls and the outer heat insulating covering therefor.

A suitable mortar will be employed in laying my new material formed substantially the same as the material heretofore described and such a mortar forms a part of the present invention and will now be described. Similarly pulverized infusorial earth is baked at a temperature and for a period of time to which the blocks or shapes have been subjected for which the mortar is designed for use. After baking the pulverized material, the same is mixed with a suitable binder consisting of magnesia, borax, lime, or the like, of from 5% to 25% of the total volume of the mixture. The mortar will therefore be composed of from 75% to 95% of baked infusorial earth and from 5% to 25% of whichever binder is selected. The mortar so formed is then mixed with the water giving the same the desired consistency when used.

My article of manufacture and many of its uses have been herein set forth as well as the process of making the same, but it will be understood that the same is capable of other uses falling within the spirit and scope of the invention as claimed.

What I claim as new is:—

1. An article of manufacture comprising a block of infusorial earth cut from the natural deposits heated to a temperature of 1800° F. and upward and then cooled.

2. The process of forming a heat and sound insulator and refractor consisting in heating a block of infusorial earth to a temperature of 1800° F. and upward, maintaining the said temperature for a period of time necessary for baking the material to the required amount for obtaining the desired results.

3. An article of manufacture comprising building material formed by subjecting infusorial earth cut into blocks or shapes from natural deposits of infusorial earth, from temperatures of 1800° to 3000° F. and upward for a period of time producing refractory, fire and sound proof material of low heat conduction, low specific gravity and great strength of compression.

4. A process of forming building material consisting in subjecting infusorial earth cut in suitable bricks and building block shapes forming the natural deposits of infusorial earth, to a temperature of from 2000° to 3000° F. and upward for a period of time by direct and indirect application of heat, the said material having low heat conduction with mechanical strength and a high melting temperature.

5. Building material consisting of infusorial earth cut from natural deposits and subjected to a temperature of 1800° F. and upward for a period of time by direct or indirect heat and thereafter cut or formed in finished shapes for the production of articles of manufacture and building materials.

In testimony whereof I affix my signature.

HERBERT CASTOR.